April 26, 1960
G. A. GUCKEL
2,934,101
PRODUCT METERING APPARATUS AND METHOD
Filed Nov. 5, 1957
2 Sheets-Sheet 1
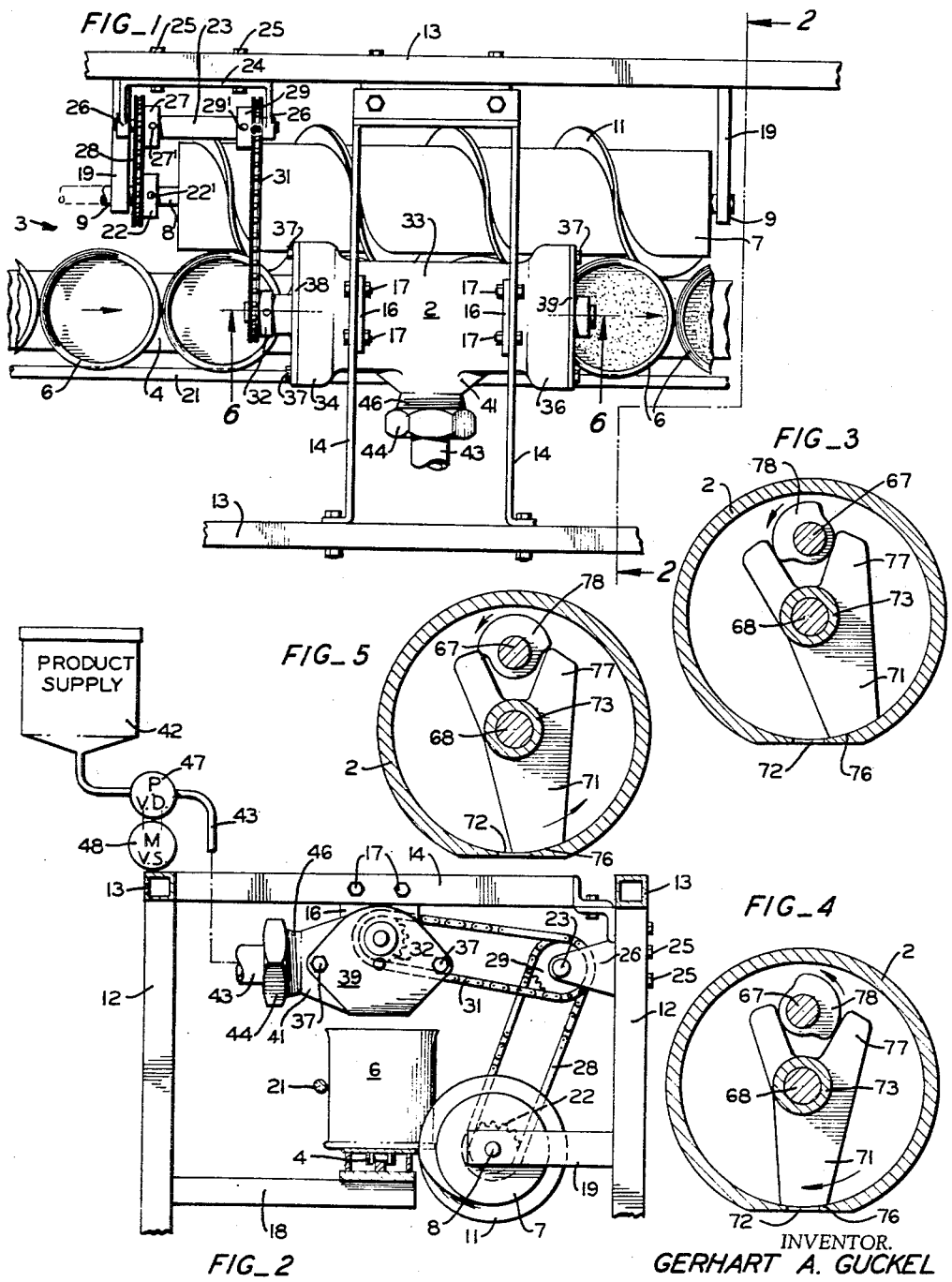

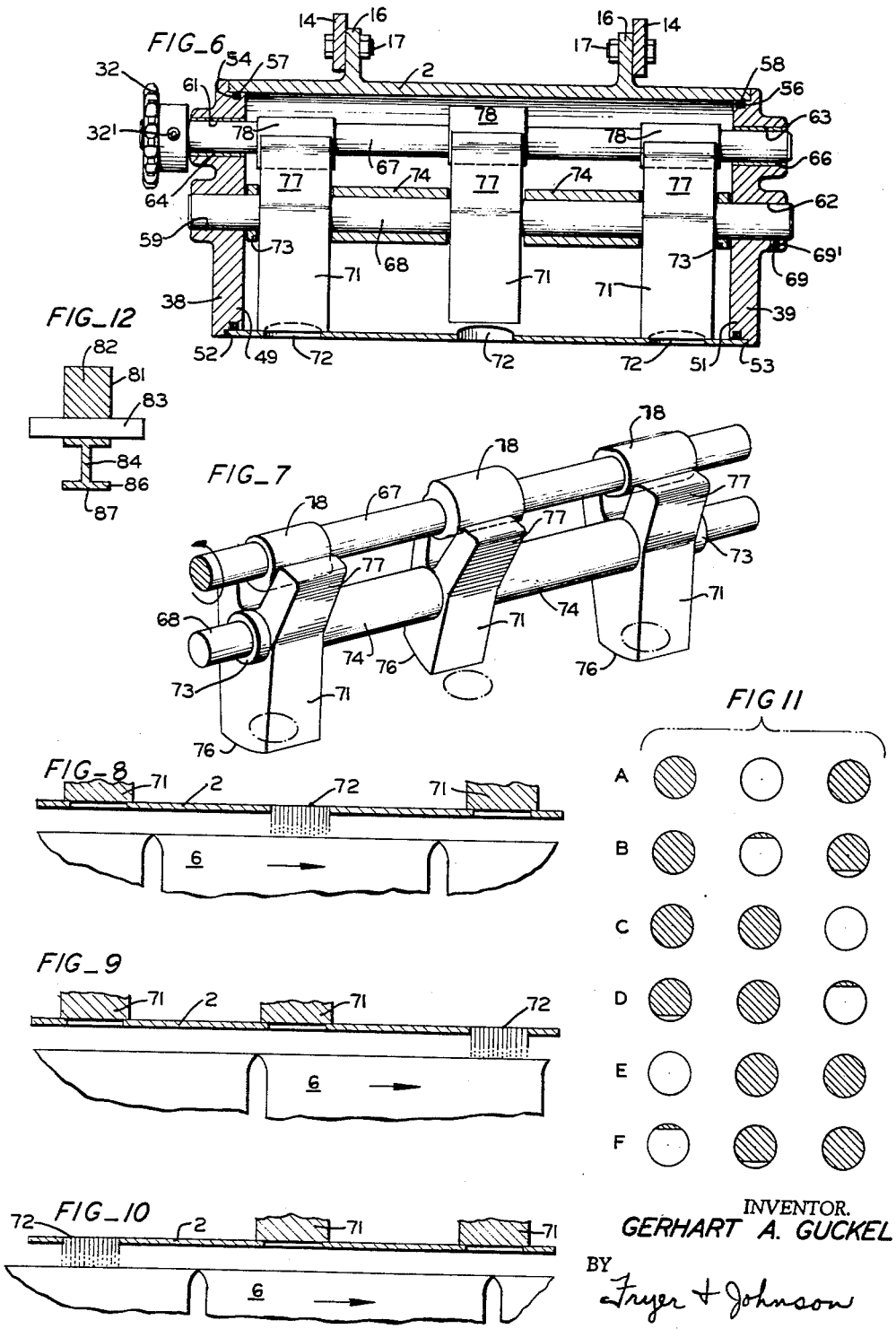

# United States Patent Office 2,934,101
Patented Apr. 26, 1960

2,934,101

PRODUCT METERING APPARATUS AND METHOD

Gerhart A. Guckel, Los Altos, Calif., assignor to James Dole Engineering Co., San Francisco, Calif., a corporation of Nevada Application November 5, 1957, Serial No. 694,671

10 Claims. (Cl. 141—11)

This invention relates to the continuous metering of a product and more particularly to an improved apparatus and method for metering such product. The present invention provides an apparatus and method which effect the continuous metering of a product for various reasons, such as for filling a continuous supply of containers moving in an uninterrupted motion without spillage of the product.

In applicant's co-pending application Serial No. 461,457, filed October 11, 1954, now Patent No. 2,827,928, issued March 25, 1958, entitled "Filling Apparatus," a product metering apparatus similar in some respects to the apparatus of the present invention is disclosed. The apparatus of the co-pending application includes a rotary valve control structure mounted in a filler casing into which a product to be metered is introduced for subsequent periodic discharge through a plurality of product discharge ports longitudinally arranged in the bottom of the filler casing.

The apparatus of the co-pending application was designed to substantially eliminate the whipping action of the metered product which occasionally resulted when the apparatus of assignee's prior Patent No. 2,667,424, dated January 26, 1954, was operated at high speeds. Under substantially all operating conditions, the apparatus of the co-pending application performs its intended function effectively and whipping of the product discharged through the ports in the bottom of the casing is substantially eliminated.

However, the apparatus of the aforementioned co-pending application includes a rotary valve member which travels with a circular motion within the filler casing, and when fluid non-viscous products, such as milk, are metered and the valve is rotated at very high speeds, a certain amount of product whipping occasionally results. The apparatus of this invention is designed as an improvement over the apparatus of the co-pending application and is intended to preclude whipping and aerating of the streams of product discharged from the filler apparatus regardless of the speeds at which the apparatus is operated or the viscosity of the product to be metered.

The present apparatus may be used to fill containers of various types, the mouths of which may be arranged in various positions relative to each other. For example, glass jars, the mouths of which are slightly spaced apart during filling, as well as cans and other flanged type containers, the flanges of which are spaced apart slightly or are overlapped during filling, may be filled with the present apparatus. Regardless of the type of container used, the present invention is effective to meter a product into such containers without interrupting the motion of the containers, without spillage of the product and with a minimum amount of aeration being produced.

The present invention further provides an accurate discharge of a filler product which may be comprised of discrete particles as well as liqui-form filler products comprised of a homogeneous liquid. The present apparatus also provides an efficient means for regulating the velocity of the filler product at various discharge points along the filler apparatus in accordance with the viscosity of the particular product to be metered. In this respect, the present apparatus may be used to meter various types of products which have varying degrees of viscosity. Edible products which effectively may be metered by the present apparatus include purees, baby foods, milk, soups and the like. This apparatus also is well adapted to meter non-edible products such as motor oil, lotions and the like.

More particularly the present invention provides a method of metering a product without whipping or aerating the streams of product discharged by the apparatus by providing a filler casing having product discharge means in a wall thereof and by periodically moving a valve control structure relative to the discharge means to periodically open and close the same. In order to carry out this method, the present invention provides an apparatus comprising an elongated filler casing having discharge means disposed along the length thereof, reciprocating valve control structure for metering a product through the discharge means in intermittent separate bodily fixed streams which are spaced longitudinally along the length of the filler casing and which are immovable in a longitudinal direction with reference to the filler casing, and means for continuously conveying containers past the filler in timed relationship with movement of the reciprocating valve control structure. The present apparatus is of simple, compact construction which is economical to manufacture and which produces a rugged filler which is well adapted to meter high viscosity products without damage.

Various other features of the present invention will become obvious from reading the disclosure set forth herein.

Referring to the drawings, which disclose one advantageous embodiment of the invention:

Fig. 1 shows a more or less schematic plan view of the filler apparatus including a filler casing mounted above a container conveyor mechanism.

Fig. 2 is an end view of the filler apparatus of Fig. 1 taken in the plane of line 2—2 of Fig. 1.

Figs. 3, 4 and 5 are vertical sections taken through the filler casing illustrating a portion of the reciprocating valve control structure. These figures illustrate a valve member in various operative positions relative to an associated discharge port in the filler casing.

Fig. 6 is a partial vertical longitudinal section through the filler casing taken in the plane of line 6—6 of Fig. 1 and illustrating the valve control structure mounted therein.

Fig. 7 is an isometric view of the valve control structure removed from the filler casing for purposes of clarity.

Figs. 8, 9 and 10 illustrate one desirable sequence in which the respective product discharge ports of the filler casing may be opened and closed periodically to allow product flow therethrough.

Fig. 11 is a schematic view illustrating, in another manner, one desirable sequence of operation of the valve members relative to the product discharge ports.

Fig. 12 illustrates a modified form of valve member for use with this invention.

While the present invention is disclosed as being applicable to the filling of product into containers, it should be understood that the invention may be used for numerous other purposes involving the metering of any pumpable product.

Referring to Figs. 1 and 2, the apparatus of this invention includes an elongated, substantially cylindrical, hollow filler casing 2 which is fixedly positioned adjacent and desirably above a conveyor mechanism 3. Any suitable conveyor mechanism may be utilized with the filler disclosed herein but a desirable conveyor mechanism includes an endless conveyor belt 4 mounted for movement directly beneath the filler casing 2 and on which are carried a plurality of containers 6. The type and size of containers to be filled may vary and either glass jars or cans may be utilized. In the illustrated embodiment containers 6 are metal cans which have their flanges in contact, or only slightly spaced apart, during their movement relative to filler casing 2.

Containers 6 desirably are carried in a continuous uninterrupted motion by the conveyor belt 4 directly beneath the filler casing 2 and in a direction moving from left to right, as indicated by the arrows in Fig. 1. However, such containers could be moved in the opposite direction if so desired. In conjunction with the conveyor belt 4 is a worm mechanism or structure 7 which is intended to position the containers 6 in predetermined relationship relative to each other on the conveyor belt 4. As can best be seen in Fig. 2, worm structure 7 desirably is positioned to one side of the conveyor belt 4.

Worm structure 7 includes a main drive shaft 8 journaled for rotation in bearings 9 positioned at each end of the worm structure. A helix 11 extends outwardly from the worm structure 7 and extends from one end thereof about the periphery of the structure to its other end. Containers 6 carried by the conveyor belt 4 desirably engage the helix 11 on the worm structure 7 and are positioned and maintained thereby in predetermined relationship one to the other and to the filler casing.

In the illustrated embodiment, the worm structure 7 is not used to convey the containers beneath the filler casing 2 but serves rather as a means for positioning the containers relative to each other; that is, the conveyor belt 4 desirably is moved at a speed slightly greater than the speed of rotation of the worm structure 7. As a result, the containers 6 are held against the rotating worm helix 11 thereby maintaining the containers in proper predetermined relationship for filling. The positioning of the containers is governed by the pitch of helix 11. If desired, however, the containers could be supported on a stationary support beneath the filler casing 2 and the rotatable worm structure 7 could be utilized to perform the double function of moving the containers beneath the filler casing while at the same time maintaining the containers in proper relationship for filling.

The filler casing 2 and the conveyor mechanism 3 may be supported in any desirable manner. As shown in Figs. 1 and 2 an openwork metal frame, comprising upright frame members 12 and longitudinally extending horizontal frame members 13, is utilized to mount the filler casing and conveyor mechanism. Extending transversely between upper frame members 13 are two parallel support members 14 from which the filler casing 2 desirably is suspended.

The casing 2 may be connected to transverse support members 14 in any conventional manner. In the embodiment illustrated, two upright flanges 16 are connected to the upper portion of the casing by any conventional means, such as by welding or by casting as an integral part of the casing. Flanges 16 have a plurality of holes formed therein which are aligned with holes extending through support members 14. Conventional nut and bolt means 17 pass through the aligned holes and maintain filler casing 2 in operative position.

Conveyor belt 4 is operatively mounted to the support frame by spaced supporting members 18 connected to upright frame members 12 in any conventional manner, such as by bolting or welding. Worm structure 7 is supported adjacent conveyor belt 4 by spaced strut members 19 similarly connected to the support frame in any conventional manner, such as by bolting or welding. Strut members 19 have aligned apertures therein and it is in such apertures that the aforementioned bearings 9 are mounted to facilitate rotation of worm structure 7.

To maintain the containers on the conveyor mechanism and in engagement with the rotating outer surface of worm mechanism 7, guide means desirably is positioned opposite from the worm structure and spaced therefrom a distance substantially equal to the diameter of the containers to be filled. Such guide means may take any convenient form but, as illustrated in Figs. 1 and 2, an elongated guide rod or rail 21, which extends the length of the worm structure 7, is suitable. Rail 21 precludes lateral outward movement of the containers away from the worm structure during travel of the containers beneath the filler casing 2.

Worm structure 7 may be rotated by any conventional drive means, such as an electric motor (not shown). Such drive means desirably is connected directly to an extension of drive shaft 8 of worm structure 7 (phantom lines, Fig. 1) and produces rotation of the worm structure to position the containers properly during their travel beneath the filler casing 2. Mounted on shaft 8 and secured thereto in any conventional manner for rotation therewith is sprocket wheel 22. In the embodiment shown, set screw 22' is used to maintain sprocket 22 in place. Rotation of drive shaft 8 of the worm structure 7 by the drive means produces corresponding rotation of sprocket wheel 22.

Positioned above worm structure 7 is a rotatable shaft 23 journaled for rotation in a substantially U-shaped shaft mounting bracket 24 secured to the mounting frame in any conventional manner, such as by bolt and nut fastening means 25. Opposite ends of shaft 23 pass into aligned apertures formed in the laterally extending spaced arms 26 of the mounting bracket 24 and are secured therein against transverse movement but are free to rotate therein.

Positioned adjacent one end of shaft 23 and secured thereto by any conventional means, such as set screw 27', is sprocket wheel 27. Sprocket 27 desirably is positioned directly in line with sprocket 22 mounted on shaft 8 of the worm structure 7. Extending between sprockets 22 and 27 and passing over the teeth in each of such sprockets is an endless drive chain 28. Upon rotation of shaft 8 of the worm structure by the drive means mentioned previously, rotation of shaft 23 also is produced due to the chain linkage between sprockets 22 and 27 positioned on the respective shafts.

Adjacent the end of shaft 23 opposite sprocket 27 is mounted another sprocket wheel 29, also secured for rotation with shaft 23, desirably by set screw 29' or other conventional means. Passing over the teeth of sprocket 29 is another endless drive chain 31, which connects sprocket 29 with a sprocket wheel 32 which forms part of the valve control structure (to be described) mounted in filler casing 2.

Upon rotation of shaft 23 movement of the valve control structure in the filler casing 2 also is produced due to the chain linkage between sprocket 29 and sprocket 32. The conveyor worm structure and the valve control structure both are driven by a common drive means; as a result, the valve control structure may be actuated in a predetermined timed relationship with respect to the speed of travel of the containers passing beneath the filler casing 2. The flow of product from the filler casing, therefore, may be regulated to correspond with the speed of travel of the containers.

The filler casing 2 desirably is of substantially tubular form and has a central portion 33 which is cylindrical in external configuration. The casing 2 is hollow throughout and desirably has an internal configuration which is circular in cross-section. The opposite ends 34 and 36 of the casing are somewhat laterally enlarged relative to central portion 33 and, as illustrated in Fig. 2, the enlarged ends have a substantially oval external configuration. Ends 34 and 36 are increased in lateral dimensions to provide means for securing casing end closure plates in place for sealing the opposite open ends of the casing.

Enlarged ends 34 and 36 have longitudinally extending threaded bores tapped in the lateral enlargements thereof for the reception of a plurality of threaded bolts 37. Plates 38 and 39 are secured in place in the enlarged ends of the filler casing 2 by passing threaded bolts 37 through appropriate spaced openings in each of the plates into the threaded bores provided in the casing ends. End closure plates 38 and 39 are externally substantially oval in shape and correspond with the shape of enlarged ends 34 and 36 of casing 2.

Intermediate the enlarged ends 34 and 36 of casing 2, and desirably extending laterally from the side thereof, is a product entry port 41. The product to be metered passes from a product supply 42, Fig. 2, through a product conduit 43 extending between the product supply 42 and the entry port 41. The product conduit 43 may be detachably connected to entry port 41 by any conventional means, such as by a pipe coupling unit including a nut member 44 threadably engaged on a threaded extension 46 of entry port 41. Nut 44 engages the end of conduit 43 and maintains such conduit in leakproof connection with the filler casing 2 during operation of the apparatus. Entry port 41, however, may be positioned in any convenient location relative to casing 2 but a more uniform distribution of product generally is effected if the entry port is formed centrally of the casing side wall as shown.

A constant supply of product may be introduced into casing 2 by means of a so-called constant volumetric discharge pump 47 interposed at a convenient location between the product supply 42 and the entry port 41. Pump 47 serves as means for supplying a fixed predetermined quantity or volume of the product into the casing per unit of time. The quantity of product introduced is regulatable at will by means of a variable speed motor 48 connected to the pump to drive the same.

With reference to Fig. 6, the end closure plates 38 and 39 include cylindrical extensions 49 and 51 respectively which correspond substantially in configuration to the internal configuration of the hollow casing 2. Cylindrical extensions 49 and 51 produce annular shoulders 52 and 53 which engage the extreme outer ends of the casing 2 when the cylindrical extensions are positioned in the casing ends and are maintained in such position by the closure plate retaining bolts 37 mentioned previously. Formed adjacent shoulders 52 and 53 in closure plate extensions 49 and 51 are annular grooves 54 and 56 respectively. Positioned in the annular grooves 54 and 56 are O-rings 57 and 58. Such O-rings may be formed of rubber, plastic or any other suitable material which properly will preclude leakage of product from the casing when the closure plates 38 and 39 are in place.

Extending transversely through closure plate 38 are vertically spaced apertures 59 and 61. Similar apertures 62 and 63 are formed in the opposite closure plate 39. When closure plates 38 and 39 are positioned in the opposite ends of the casing 2, apertures 61 and 63 are axially aligned to receive a shaft therethrough, as are apertures 59 and 62. In aperture 61 is positioned a cylindrical bearing member 64 which tightly embraces the interior of aperture 61. A similar bearing 66 is positioned in aperture 63 in closure plate 39. Extending through bearings 64 and 66 and rotatable therein is cam shaft 67.

On the outer end of cam shaft 67 the sprocket wheel 32, mentioned previously, is secured by any conventional means, such as by set screw 32'. As a result of the interconnected chain drives mentioned previously, rotation of sprocket wheel 32 is effected upon rotation of shaft 8 of worm structure 7. Positioned below cam shaft 67, and spaced a small distance therefrom and extending parallel thereto, is rocker shaft 68 which extends through the aligned apertures 59 and 62 formed in closure plates 38 and 39. Rocker shaft 68 is non-rotatably secured in the casing 2 by any conventional means, such as by a set screw 69 passing through a threaded aperture 69' provided in a hub extension of end closure plate 39. Set screw 69 frictionally engages shaft 68 and maintains the same stationary relative to the filler casing 2.

The exact positioning of cam shaft 67 and rocker shaft 68 may be varied as desired to meet a particular need, but in the embodiment illustrated rocker shaft 68 is positioned with its axis corresponding substantially to the longitudinal axis of the tubular casing 2. Cam shaft 67 desirably is positioned directly above rocker shaft 68 and extends parallel to the longitudinal axis of the casing. Part of the valve control structure, including rocker shaft 68 and cam shaft 67, serves as means for mounting discharge port sealing valve means (to be described) within the casing for reciprocating movement relative to product discharge ports in the casing wall.

Movably mounted on rocker shaft 68 are valve means which desirably take the form of a plurality of longitudinally spaced rocker valve members 71, each of which is adapted to periodically open and close one of the plurality of longitudinally spaced product discharge ports 72 formed in a wall of the filler casing 2. The spacing of valve members 71 on rocker shaft 68 corresponds to the spacing of discharge ports 72 in the casing wall. It is through discharge ports 72 that the product is metered in separate bodily fixed streams which are spaced longitudinally with respect to each other and which are immovable longitudinally with respect to the casing. Desirably the ports 72 are circular in cross-section and are arranged in a row along the bottom of the casing to allow product discharge therethrough directly into the series of containers carried therebeneath by the conveyor mechanism 3 described previously.

Any predetermined number of discharge ports may be formed in a filler casing but, as shown in Fig. 6, three discharge ports 72 are utilized in the illustrated embodiment and a corresponding number of valve members 71 are mounted on rocker shaft 68. The endmost valve members are spaced from the inner wall of end closure plates 38 and 39 in any conventional manner, and small spacer shims 73 which surround the rocker shaft 68 have been found satisfactory for this purpose. Interposed between adjacent valve members 71 are elongated spacer shims 74 which maintain the valve members in a proper pre-arranged position. If desired, however, spaced shoulders could be formed on rocker shaft 68 to position the valves 71 thereon.

The exact size and shape of the product discharge ports 72 may be varied depending upon the type of filler product to be metered, the viscosity of such filler product and the velocity with which such product is to be discharged. It should be understood, however, that the bottom discharge port sealing end 76 of each of the valve members 71 is slightly larger in area than the area of the associated product discharge port 72 thereby insuring complete periodic closing of the discharge port as the valve member reciprocates across the discharge port in a plane substantially at right angles to or transverse to the axis of the casing 2.

As shown in Figs. 3 to 5, desirably the interior of the filler casing is circular in cross-section. Accordingly, the lower port sealing end 76 of each of the valve members 71 is rounded to correspond in shape with the internal wall of the filler casing 2. Rounded end 76 of each valve member serves as a product discharge port sealing surface which is in the form of an arc of a circle, the radius of which corresponds to the internal radius of the casing, thereby insuring proper sealing engagement of the valve end with the inner wall of the casing 2 as the valve moves relative to an associated discharge port. The casing interior could be of other configurations than that illustrated and the sealing end 76 of each of the valve members 71 could be modified accordingly.

Desirably, each of the valve members 71 is substantially Y-shaped, as is illustrated in Figs. 3 to 5 and 7. The forked upper end 77 of each valve member forms cam follower means by which each of the valve members is moved back and forth to periodically open and close its associated product discharge port 72. Cam shaft 67 includes thereon spaced cam means engageable with the cam followers of the respective valve members for effecting reciprocating motion of such valve members in a plane substantially transverse to the axis of the filler casing. The cam means connected to cam shaft 67 desirably is in the form of a plurality of cam sections 78, each of which is angularly offset with respect to the other cam sections and each of which is longitudinally spaced from the other a distance corresponding substantially to the spacing of the valve means 71 on rocker shaft 68.

In the illustrated embodiment, cam sections 78 are shown as separate members which are secured to cam shaft 67 in any conventional manner, such as by welding. However, a set screw, taper pin or other means could be utilized to secure the cam sections 78 in place on cam shaft 67. Similarly, if desired, cam shaft 67 and the plurality of cam sections 78 could be integrally formed, such as by machining or casting. Desirably, each angularly offset cam section 78 is concentric with the axis of cam shaft 67 so that the outer surface of the cam section which engages the cam follower 77 of an associated valve is arcuate in configuration. The dimensions of cam sections 78 and cam followers 77 in a direction longitudinal of the casing 2 desirably are substantially equal, as shown in Fig. 6.

Upon rotation of cam shaft 67 valve members 71 are moved back and forth periodically across respective product discharge ports 72 to effect periodic flow of product through such ports. One desirable sequence of movement of a single valve member is illustrated in Figs. 3 to 5. Referring first to Fig. 3, as offset cam section 78 engages the left side of the forked cam follower portion 77 the valve member 71 is moved transversely to the right away from the discharge port 72 to allow free product flow through the port. Upon continued rotation of the cam shaft 67 in a counterclockwise direction, as illustrated in Fig. 4, the offset cam section 78 engages the right branch of the forked cam follower portion 77 thereby forcing the valve member 71 to pivot on rocker shaft 68 and move to the left (in the direction of the arrow) to completely close discharge port 72. Fig. 5 illustrates the start of a new sequence in which the cam section 78 is engaged with the left branch of the forked cam follower 77 thereby again forcing valve member 71 to the right to open the discharge port 72 as described previously. Opposite arms of the forked cam follower extension 77 of each valve member are differentially offset relative to the axis of rocker shaft 68 thereby resulting in reciprocating movement of the valve member, as illustrated, upon alternate engagement of cam section 78 with the opposite arms of the forked extension.

To maintain turbulence of the product in the casing to a minimum, the valve members 71 desirably do not move entirely across the ports from one side to the other; that is, the valves, when closed, do not move beyond the dead center position shown in Fig. 4. When a port is closed the valve remains in the position of Fig. 4 for a predetermined time, the time being governed by the peripheral extent of the associated cam section of the cam shaft, and then moves back to the full open position shown in Fig. 3.

If desired the valves could be mounted to move entirely across the discharge ports, from one side thereof to the other. However, one of the purposes of the present invention is to preclude whipping and aerating of the product as it is discharged from the casing in bodily fixed streams. To minimize such whipping and aerating it is desirable to keep the extent of reciprocating motion of each of the valve members to a minimum. By limiting the extent of the reciprocating back-and-forth movement of the valves between the respective full-open and full-close positions shown in Fig. 3 and Fig. 4, whipping or churning of the product in the casing is substantially eliminated, and non-viscous products, such as milk, may be metered without an undesirable amount of aeration being produced.

Whipping and turbulence of the filler product in the casing may be minimized further by utilizing reciprocating valve members of the type illustrated in Fig. 12. The modified valve member 81 illustrated has a substantially Y-shaped configuration of the type previously described, including an upper forked cam follower portion 82 adapted to engage the cam section of a rotatable cam shaft. The modified valve is mounted for movement on a rocker shaft 83, also as described previously.

The lower portion of the valve member 81 is modified in that the cross-sectional area of part of the lower portion is reduced to provide a relatively thin connecting means in the form of a web or spoke section 84 which connects a port discharge sealing section 86 with the remainder of the valve member. The outer surface of sealing section 86 is an arcuate discharge port sealing surface 87 which conforms in configuration to the interior of an associated filler casing, as described previously.

Lower sealing end section 86 of the modified valve 81 has a sufficiently large cross-sectional area to properly close an associated discharge port, but the reduced web 84 allows the valve to slice or pass easily through the product in the casing thereby maintaining the amount of turbulence and whipping of the product at a minimum.

The sequence in which the respective discharge ports are opened and closed by valve members 71 may be varied by modifying the angularly offset positions of the cam sections 78 on cam shaft 67. The discharge ports may be opened or closed for any predetermined amount of time by modifying the peripheral extent of the arcuate outer faces of the cam sections 78.

One desirable sequence of operation for the illustrated embodiment of this invention is shown in Figs. 8–10. When the present apparatus is used with small containers it is desirable that only one discharge port be open at a time. Accordingly as shown in Fig. 8, the middle discharge port may be opened first while the left and right end ports are fully closed. Fig. 9 illustrates the next step in the sequence in which the end port to the right of the filler casing is fully opened while the other two ports are closed. Fig. 10 illustrates completion of the sequence with the left port fully opened with the other two ports fully closed. As the containers are moved by the conveyor mechanism beneath the filler casing in an uninterrupted motion, and as the edges of adjacent container mouths pass beneath a discharge port, that discharge port is closed at that time to preclude spillage of product into the space between adjacent containers.

Fig. 11 is a different manner of illustrating the periodic opening and closing of the discharge ports in the same sequence shown in Figs. 8–10. Rows A, C and E of Fig. 11 correspond to Figs. 8, 9 and 10 respectively, while rows B, D and F of Fig. 11 show the intermediate transitional stages of product flow through the respective discharge ports. Fig. 11, however, is intended to be merely illustrative of one desirable sequence in which the ports may be opened and closed and is not necessarily intended to indicate partial flow of the product through the ports. In Fig. 11, those portions of the respective ports which are hatched are covered by an associated valve member, while the unhatched portions of the ports are uncovered to allow product flow.

Referring to row B, for example, it will be noted that as the middle port begins to close, the right end port begins to open. Because of the reciprocating motion of each valve member in a plane transverse to the filler casing axis, the ports begin to open and close from diametrically opposite sides of the ports, as shown in rows B, D and F.

As mentioned previously, the product is introduced into the filler casing by a constant volume pump under a substantial pressure. For this reason it is not desirable to completely close all the ports at one time, in that to do so possibly would result in a bursting of the casing due to the pressure of the product introduced therein by the constant volume pump 47. However, if desired, a gravity feed could be utilized to introduce product into the casing, and if a gravity feed is utilized, all three ports could be temporarily closed at the same time if such sequence is desirable for a particular purpose.

The disclosed apparatus desirably is intended for high speed operation to meter product into comparatively small containers without spillage of the product. Because the valve members 71 move in a reciprocating fashion rather than in a rotary fashion, substantially all whipping and turbulence of the product is precluded as described previously.

While the disclosed apparatus may be utilized to fill containers of various sizes and may be utilized to meter products of various viscosities and content by modifying the size, shape, and number of the discharge ports, the spacing of the ports, the length of the casing, the speed of rotation of the cam shaft, the speed of travel of the containers, the viscosity of the product, and the like, it has been found that the apparatus is well adapted for metering products, such as baby foods, into comparatively small containers, such as baby food cans or jars.

Baby food cans generally are designated in the trade as 202 x 214 cans, namely cans which are 2⅛ inches in diameter and 2⅞ inches tall. When used with cans of the size described, the speed of travel of the containers beneath the filler casing is variable, depending upon the type of filler used, but may run as high as 250 containers per minute.

Although the filler of the present invention may be operated at very high speeds, when a three port filler of the type illustrated in Figs. 6 and 7 is utilized, the speed of operation must be substantially decreased due to the comparatively short length of the filler casing and the size and number of discharge ports in the casing bottom. Because of the comparatively small size of the baby food cans, the discharge port diameter must be comparatively small to preclude spilling of the product as the cans travel beneath the casing.

The three port filler of Fig. 6 is adapted for comparatively slow speed operation and has the following dimensions: The casing overall length, including end closure plates 38 and 39, is approximately 5½ inches; the internal diameter of the casing is 4 inches, and the three product discharge ports are spaced in a row along the bottom of the casing a distance of 1 3/16 inch between centers of adjacent ports. The discharge ports are circular in cross-section and have the relatively small diameter of 7/16 inch.

The sealing end of each of the valve members 71 is slightly larger in cross-sectional area than the diameter of the associated discharge port. The downwardly extending portion of each of the valve members 71 which forms sealing surface 76 is substantially square in cross-section, the length of each side of such square being 11/16 inch.

The cam sections 78 mounted on cam shaft 67 extend for 120° around the cam shaft 67 so that each discharge port is alternately open for 120° for rotation of the cam shaft and closed for 240° of rotation of the cam shaft. End closure plates 38 and 39 approximately 1½ inches thick at their thickest point. The cylindrical shoulders 49 and 51 of the end closure plates extend into the filler casing 9/16 inch and shims 73 are ⅛ inch thick to space the end valve members 71 and cam section 76 a short distance from the inner faces of the end closure plates 38 and 39. For purposes of clarity of illustration, certain of the features of Fig. 6 have been exaggerated and the figure is not intended as being drawn to scale.

When a filler having the above listed dimensions is used to fill baby food cans of the size described, the cans are moved at the comparatively slow speed of 60 cans per minute. At such speed the cam shaft 67 is rotated at 60 revolutions per minute, and each rotation of the cam shaft produces one complete can filling. At such speed, 2.4 gallons per minute of product is metered through the filler casing into the cans passing thereunderneath.

By increasing the number of discharge ports within the filler casing and accordingly increasing the casing length, substantially higher filling speeds may be produced. For example, by utilizing a filler casing which is approximately 11 inches in overall length, including end closure plates 38 and 39 positioned in the casing ends, by forming twelve discharge ports in the casing bottom, by mounting twelve valve members on the rocker shaft, and by securing twelve cam sections on the cam shaft to actuate the valve members, the filling speed for size 202 x 214 baby food cans may be increased to 200 cans per minute. Accordingly the speed of rotation of the cam shaft is 200 revolutions per minute, or one can filling per revolution.

When twelve discharge ports and valves are used in a high speed filler as described, the port diameter remains unchanged at 7/16 inch and the filler internal diameter remains 4 inches, but the ports are positioned closer together, with a spacing of ⅝ inch from center to center of adjacent ports. The spacing of the valves on the rocker shaft is modified accordingly. When a twelve port filler is run at speeds of 200 cans per minute, each port is open for 90° of rotation of the cam shaft and is closed for 270° rotation of the cam shaft. The period during which each of the valves closes an associated port may be varied by modifying the peripheral extent of the cam sections 78 on the cam shaft. During high speed operation, as above described, eight gallons of product are metered per minute by the twelve port filler casing and the product passes through four ports which are open at the same time. The open ports are spaced along the length of the filler, however, so that product is discharged into several cans at once.

From the foregoing it should be understood that various size containers may be filled utilizing the apparatus of the present invention. The speeds of 60 and 200 cans per minute described above with reference to the two exemplary filler modifications are not the upper and lower operating limits and cans may be filled at lower or higher rates than indicated if desired by modifying the variable structural features of the casing.

The apparatus of the instant invention is particularly desirable in that, as mentioned previously, it precludes whipping of the product as the valve members move back and forth across the product discharge ports in planes which are substantially transverse to the axis of the casing. Similarly the valve control structure described is of simple yet rugged construction thereby making the structure suitable for use with viscous products. As a result of the simple construction, the casing is relatively inexpensive to manufacture and may be readily disassembled for cleaning and the like.

The fillers described herein are adapted for the continuous filling of any pumpable product and may be employed with aseptic sealing apparatus like that disclosed in Patent No. 2,549,266, dated April 17, 1951.

Numerous modifications of the filter apparatus and method of this invention may be produced by varying the respective features of the filler, as set out herein previously. The filler modifications described specifically herein are intended to be illustrative only of several desirable types of fillers, but other modifications may become evident to one skilled in the art upon reading the foregoing description. The present invention, therefore,

I claim:

1. Apparatus for metering a product comprising a hollow elongated casing having a plurality of product discharge ports in a wall thereof longitudinally spaced therealong; and a valve control structure within said casing for periodically opening and closing said discharge ports comprising a rotatable cam shaft extending longitudinally of said casing and having spaced angularly offset cam means thereon, a rocker shaft extending longitudinally of said casing, a plurality of valve members cooperable with the respective discharge ports and mounted for movement on said rocket shaft, and cam follower means on each of the valve members engageable with the respective cam means on said cam shaft to effect back and forth movement of the respective valve members upon rotation of said cam shaft.

2. A filler comprising a hollow elongated casing having a plurality of longitudinally spaced product discharge ports in a wall thereof, and valve control structure in said casing comprising a rocker shaft extending longitudinally of said casing, a plurality of spaced apart valve members movably positioned on said rocket shaft, each of said valve members having a cam follower portion thereon, the number of said valve members corresponding to the number of said discharge ports and each valve member being aligned with a discharge port for alternately opening and closing the same, and a cam shaft rotatably mounted in said casing and extending longitudinally therof comprising angularly offset cam sections engageable with the cam follower portions of the respective valve members whereby rotation of said cam shaft produces back and forth movement of said valve members relative to said discharge ports to periodically open and close the same to allow periodic flow of product therethrough in separate bodily fixed streams immovable longitudinally relative to said casing.

3. Filler apparatus for filling containers with a product comprising an elongated hollow filler casing having a plurality of longitudinally spaced product discharge ports in a wall thereof; means for supplying product into said casing for filling into said containers through said discharge ports; valve control structure mounted in said casing and extending longitudinally thereof comprising a rocker shaft non-rotatably secured in said casing and spaced from said discharge ports, a plurality of valve members corresponding in number to said plurality of discharge ports journaled for back and forth movement on said rocker shaft, said valve members being aligned with the respective discharge ports and cooperable therewith to periodically open and close the same, and means engageable with said valve members for moving the same comprising a rotatable cam shaft extending longitudinally of said casing, said cam shaft having cam sections thereon engageable with said valve members for periodically moving said valve members upon rotation of said cam shaft to open and close said ports for effecting periodic flow of said product in bodily fixed streams therethrough; and conveyor means for continuous moving said containers past said ports in timed relationship with the movement of said valve members to effect uniform filling of said containers without spillage.

4. Apparatus for metering a product comprising an elongated hollow filler casing having a plurality of longitudinally spaced product discharge ports in a wall thereof; means for supplying product into said casing for discharge through said ports; valve control structure in said casing comprising a longitudinally extending rotatable cam shaft having angularly offset cam means thereon, a non-rotatable longitudinally extending rocker shaft positioned in said casing, a plurality of valve members mounted in spaced relationship on said rocket shaft for back and forth movement thereon, cam follower means on said valve members engageable with said cam means on said cam shaft whereby rotation of said cam shaft produces back and forth movement of said valve members to periodically open and close said ports for effecting periodic flow of said product in bodily fixed streams therethrough; and conveyor means for continuously moving said containers axially past said ports in timed relationship with the movement of said valve members to effect uniform filling of said containers without spillage.

5. Apparatus for metering a product comprising a hollow casing having a plurality of product discharge ports in a wall thereof longitudinally spaced therealong; and a valve control structure within said casing for periodically opening and closing said discharge ports comprising a movable shaft extending longitudinally of said casing, a plurality of valve members cooperable with the respective discharge ports of said casing pivotally mounted in said casing, and means on said shaft engageable with the respective valve members to effect back and forth movements of said valve members in planes transverse to the axis of said casing upon movement of said shaft thereby to periodically open and close the respective discharge ports to allow periodic flow of product therethrough in separate bodily fixed streams.

6. Container filler apparatus for obviating whipping and minimizing aerating of a flowable product while metering the same into a series of containers continuously conveyed past said apparatus comprising an elongated hollow casing having a plurality of spaced, aligned product discharge ports in a wall thereof; and valve control structure within said casing for periodically opening and closing said discharge ports comprising first and second shafts extending longitudinally of said casing, said first shaft being rotatable relative to said second shaft, a plurality of reciprocable valve members movably mounted on said second shaft and cooperable with the respective discharge ports of said casing, and means on said first shaft engageable with the respective valve members to effect back and forth movement thereof upon rotation of said first shaft thereby to periodically open and close the respective discharge ports to allow periodic flow of product therethrough in separate bodily fixed streams which are immovable longitudinally of said casing.

7. Apparatus for metering a product into a container movable relative thereto comprising a hollow casing having a product discharge port in a wall thereof, and valve control structure within said casing for periodically opening and closing said discharge port to allow periodic flow of product therethrough; said valve control structure comprising a discharge port sealing valve member mounted in said casing for reciprocal movement therein, means mounting said valve member in said casing spaced from said casing wall whereby product introduced into said casing may flow about said mounting means and at least part of said valve member, and mechanism operatively engaged with said valve member for moving the same back and forth across said discharge port in reciprocating fashion in a plane generally transverse to the axis of said casing and in timed relationship to movement of said container whereby said valve member passes through said product in said casing as said valve member periodically opens and closes said discharge port whereby whipping of said product is obviated and aerating of the product is minimized as the product is metered from said casing into said container.

8. Apparatus for metering a product into a series of containers movable relative thereto, comprising a hollow filler casing having a plurality of product discharge ports in a wall thereof and spaced longitudinally therealong, and valve control structure mounted in said casing for metering product periodically and sequentially through said discharge ports in discrete product streams into said containers; said valve control structure comprising a plurality of individually movable spaced valve members the number of which are at least equal to the number of said discharge ports whereby each discharge port may be periodically opened and closed by an associated valve member to effect periodic product flow therethrough, means spaced from said casing wall pivotally mounting said valve members for reciprocal, individual and sequential movement relative to said discharge ports whereby product introduced into said casing may flow about said mounting means and at least part of the respective valve members and through the respective discharge ports when the same are open, and mechanism operatively engaged with said valve members for moving the same individually and sequentially back and forth through said product in said casing and across the respective discharge ports in timed relationship to each other and to movement of said containers relative to said casing whereby the respective discharge ports may be periodically opened and closed to meter discrete streams of product periodically and sequentially into said containers as the containers are located adjacent the discharge ports.

9. A method of metering a product comprising introducing a quantity of said product into a casing having a plurality of spaced discharge ports in a wall thereof, and effecting periodic flow of product in separate streams through the respective discharge ports by sequentially and periodically uncovering and covering individual discharge ports by moving valve members sequentially and periodically in reciprocating fashion and through predetermined limited paths individually back and forth over the respective discharge ports in timed relationship relative to each other so that the respective discharge ports are periodically opened and closed and aeration and whipping of product is minimized as the product is metered through said discharge ports in discrete spaced sequential streams.

10. A method of metering a flowable product and filling the same into a series of containers so that aeration and whipping of the product metered is minimized, comprising introducing a quantity of said product into a casing having a plurality of spaced discharge ports in a wall thereof, moving said series of containers in uninterrupted fashion past said discharge ports, and effecting periodic flow of product through the respective discharge ports in separate sequential streams by sequentially and periodically uncovering and covering individual discharge ports by moving valve members individually through said product back and forth in predetermined limited paths in reciprocating fashion over the respective discharge ports in a predetermined sequence and in timed relationship to movement of each other and to movement of said containers so that the respective discharge ports are periodically and sequentially opened and closed in timed relationship to movement of said containers therepast and product is metered into said containers in sequential discrete streams to fill said containers uniformly.

References Cited in the file of this patent

UNITED STATES PATENTS

| | | |
|---|---|---|
| 735,638 | Wickson | Aug. 4, 1903 |
| 1,390,383 | Powell | Sept. 13, 1921 |
| 1,571,744 | Vorel | Feb. 2, 1926 |
| 1,667,959 | Talbot et al. | May 1, 1928 |
| 2,080,924 | Logan et al. | May 18, 1937 |
| 2,631,768 | McMartin et al. | Mar. 17, 1953 |
| 2,776,786 | Pankratz | Jan. 8, 1957 |
| 2,785,707 | Ryan et al. | Mar. 19, 1957 |

FOREIGN PATENTS

| | | |
|---|---|---|
| 455,712 | Canada | Apr. 5, 1949 |